United States Patent [19]

Suzuki

[11] 3,947,883

[45] Mar. 30, 1976

[54] INDICATOR DEVICE FOR SLOT-IN TYPE CASSETTE TAPE RECORDER

[75] Inventor: Shoji Suzuki, Iwaki, Japan

[73] Assignee: Alps Motorola, Inc., Tokyo, Japan

[22] Filed: Jan. 2, 1975

[21] Appl. No.: 538,094

[30] Foreign Application Priority Data

Feb. 20, 1974 Japan............................ 49-19722[U]

[52] U.S. Cl. ....................... 360/93; 360/85; 360/96; 360/132
[51] Int. Cl.².. G11B 1/02; G11B 23/04; G11B 5/78
[58] Field of Search ............ 360/93, 96, 92, 85, 132, 360/137; 312/DIG. 21, DIG. 13, DIG. 9; 242/193-194, 199-200; 352/78 R

[56] References Cited
UNITED STATES PATENTS

| 3,524,651 | 8/1970 | Ketzer | 360/93 |
| 3,608,908 | 9/1974 | Yamamoto | 360/93 |
| 3,675,876 | 7/1972 | Frederick | 360/93 |
| 3,800,328 | 3/1974 | Harlan et al. | 360/137 |
| 3,888,494 | 6/1975 | Herst | 360/137 |

Primary Examiner—Alfred H. Eddleman
Attorney, Agent, or Firm—James W. Gillman; Donald J. Lisa

[57] ABSTRACT

A slot-in type cassette tape recorder/player unit of the type in which a tape cassette is laterally inserted into the recorder/player unit through an opening provided on the front panel thereof includes a movable cassette holder shifted between first and second vertical positions so that the tape cassette can be brought into and released from operable engagement with the tape transport mechanism and magnetic heads of the device. An indicator plate is carried by the cassette holder and is moved into position to cover the opening for the cassette insertion when the tape cassette is brought into the operable position.

6 Claims, 2 Drawing Figures

INDICATOR DEVICE FOR SLOT-IN TYPE CASSETTE TAPE RECORDER

BACKGROUND OF THE INVENTION

The present invention is in general directed to an improvement in a cassette tape recorder/player of the so-called "slot-in" type in which a tape cassette is inserted laterally into the recorder/player unit through an opening provided on the front panel of the unit, and more particularly to a "play" indicator for the cassette tape unit.

A disadvantage of the slot-in type cassette tape recorder/player unit is that the opening in the front panel for cassette insertion usually remains open after a tape cassette has been inserted and placed in operating position. This opening often makes it difficult to tell whether or not a tape cassette is already inserted into the unit. Furthermore, when a tape cassette is in operating position, the interior of the unit may be seen through the opening, which detracts from its appearance, and also permits dust and dirt to get into the unit which is detrimental to its operation.

It is, therefore, desirable to provide a slot-in type cassette tape recorder which is not subject to this disadvantage when a tape cassette is loaded in operating position.

SUMMARY OF THE INVENTION

Accordingly, it is an object of this invention to provide an improved cassette tape recorder/player.

It is an additional object of this invention to provide an improved "slot-in" type cassette tape unit.

It is an additional object of this invention to provide an improved "slot-in" type cassette tape unit in which the cassette receiving opening is closed when a cassette is inserted and placed in operating position in the unit.

It is a further object of this invention to provide an improved "slot-in" type cassette tape unit in which the tape cassette receiving opening is closed by an indicator panel when the cassette is placed in an operating position.

In accordance with a preferred embodiment of this invention, a "slot-in" type cassette tape recorder/player housing has a front panel with a cartridge receiving opening in it. The cassette holder is located in a first position aligned with the cartridge receiving opening and has a pivoted door in it for permitting entry of a cassette cartridge into the holder. After the cartridge is inserted into the holder, the holder is movable vertically from its cartridge receiving position to second position behind the front panel of the housing to cause the cassette cartridge to engage the tape drive mechanism of the unit in an operative relationship. An indicator panel is attached to the cassette holder and moves with it; so that when the cassette holder is moved to its second position, the indicator panel is aligned with the cartridge receiving opening in the front panel. This substantially closes the front panel and provides an indication that a cassette is in the unit in a record/play position.

The novel features which are considered as characteristics of the present invention are set forth in particular in the appended claims. The improved "slot-in" type cassette tape recorder itself, however, both as to its construction and to its mode of operation, together with additional features and advantages thereof, will be best understood upon perusal of the following detailed description of a specific embodiment with reference to the accompanying drawings in which:

DETAILED DESCRIPTION

Figure 1:
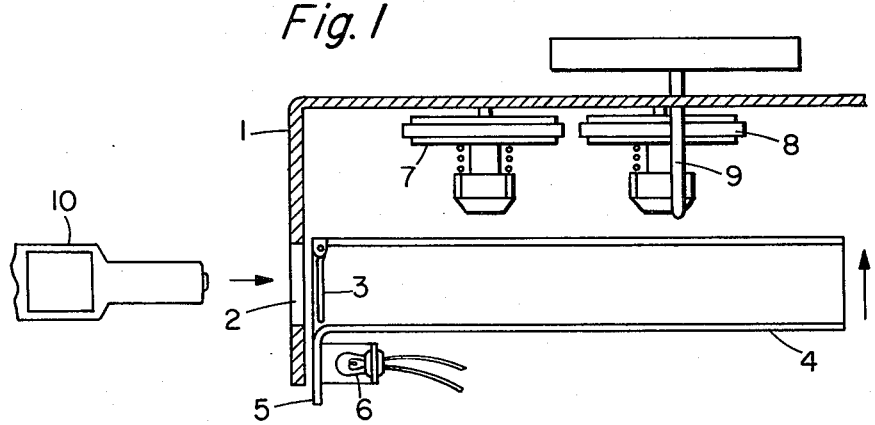
FIG. 1 is a cross-sectional view of a slot-in type cassette tape recorder/player unit in accordance with a preferred embodiment of the present invention, in which tape cassette is not inserted.

Referring now to the accompanying drawing, wherein the same reference numerals are used in both figures to denote the same components, there is shown a slot-in type cassette tape unit 1 having an opening 2 for cassette insertion in the front panel of the unit 1. A movable cassette holder is located inside the unit 1 and accepts an inserted cassette 10. The holder 4 shifts up and down vertically to place the cassette into or release it from an operating position. A flap or door 3 is pivotally hinged across the end of the holder 4 which is adjacent the opening 2. An indicator plate 5 is formed integrally with the cassette holder 4, so that when the cassette holder 4, carrying an inserted cassette 10, is moved upwardly, the indicator plate 5 also moves up with the cassette holder to cover the opening 2 in the front panel of the unit. A lamp 6 is located behind the plate 5 for illuminating the plate to cause it to be visible through the opening 2. A supply reel and a take-up reel 7 and 8, respectively, and a capstan 9 are located in the unit for operative engagement with a cassette 10 in the holder 4.

The operation of the slot-in type cassette tape recorder/player constructed as disclosed above will now be described with reference to the drawings.

FIG. 1 illustrates the state in which a tape cassette 10 is about to be inserted. Accordingly, the cassette holder 4 is located in a first position so that the flap 3 thereof is opposite the opening 2. As a result the indicator plate 5 is out of sight below the opening 2 behind the front panel of the unit.

Figure 2:
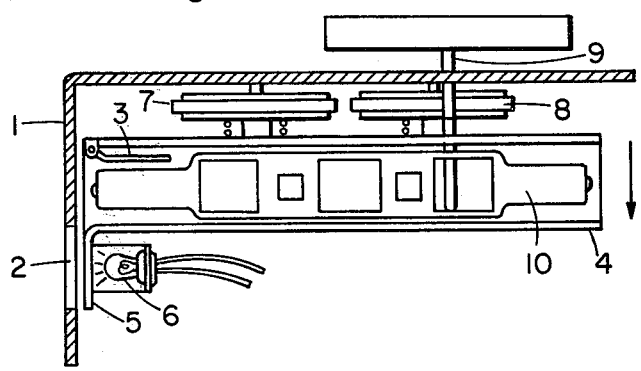
FIG. 2 is a cross-sectional view of the slot-in type cassette tape recorder illustrated in FIG. 1 with a tape cassette inserted and placed in operating position.

With insertion of a tape cassette 10 into the cassette holder 4 through the opening 2, the flap 3 is pivoted upwardly in the counter-clockwise direction (as viewed in FIGS. 1 and 2) by the tape cassette 10. When the tape cassette 10 is completely inserted, a suitable shifting mechanism for the cassette holder 4 is energized to shift the tape cassette 10 up to the operating position in which the tape cassette 10 engages with the supply reel tape transport means 7 and 8, magnetic transducer heads and other conventional parts necessary for recording or reproducing. Although the shifting mechanism is not described in detail in this disclosure, one example of a suitable mechanism is disclosed in Japanese Pat. No. 47-49010.

As the cassette holder 4 is shifted up, the indicator plate 5 is simultaneously shifted up to a position to cover the opening 2, and thus the indicator plate 5 now can be seen from outside the unit through the opening 2 and indicates that a tape cassette is in operating position.

In order to release the cassette 10 after it is placed in operating position, a suitable conventional means (not shown) such as an operation lever or eject button is operated. This causes the tape cassette 10 to be disengaged from the tape transport mechanism 7, 8; and the cassette holder 4 is shifted down to its original position wherein the tape cassette 10 may be pushed out through the opening 2.

From the foregoing, it is apparent that when the slot-in type cassette tape recorder/player unit in accordance with the illustrated embodiment is in a play mode, the indicator plate 5 is placed behind the opening 2 and is illuminated by the lamp 6. This improves the appearance of the unit and also gives a distinct indication. Furthermore, such construction reduces the amount of dust and dirt that can enter the unit when it is operating. The indicator plate 5 may carry any desired indicia or decoration on it.

Although in the embodiment described above, the indicator plate 5 is integral with the cassette holder 4, it can be separate from the cassette holder as long as the indicator plate 5 may be moved to cover the opening 2 when the tape cassette 10 is in operating position.

Though the present invention has been described with respect to a certain specific embodiment, it will be appreciated by those skilled in the art that modifications and changes may be made without departing from the true spirit and scope of the present invention.

I claim:

1. A cassette tape player including a tape drive mechanism comprising in combination:

a housing;

a panel in said housing having a cassette cartridge receiving opening therein;

a cassette holder located within said housing in a first position aligned with said cassette cartridge receiving opening and having a door pivotally mounted thereon to close said opening with no cassette therein, said door pivoted to permit entry of a cassette into said cassette holder, said holder being movable from said first position to a second position wherein a cassette in said holder engages the tape drive mechanism of said player; and an indicator means mounted for movement with said cassette holder so that when said cassette holder moves to said second position, said indicator means is aligned with said receiving opening in said panel to indicate the presence of a cassette in playing position.

2. The combination according to claim 1 wherein said indicator means is attached to said cassette holder immediately adjacent said panel in said player housing.

3. The combination according to claim 2 wherein said cassette holder moves from said first position to said second position in a direction parallel to the plane of said panel having said cassette cartridge receiving opening therein.

4. The combination according to claim 1 further including means for illuminating said indicator means with said cassette holder in said second position.

5. The combination according to claim 4 wherein said indicator means comprises an indicator plate having indicia thereon and said means for illuminating is located on the opposite side of said indicator plate from the cartridge receiving opening in said panel.

6. The combination according to claim 1 wherein the tape drive mechanism in said tape player housing is located above said cassette holder and said indicator means is mounted on said cassette holder immediately below said door therein and located adjacent said housing panel, with said second position of said cartridge holder being located a predetermined distance above the first position thereof, said predetermined distance being sufficient to cause engagement of the tape drive mechanism with a cassette located in said cassette holder and sufficient to cause said indicator means to substantially cover the opening in said housing panel.

* * * * *